United States Patent [19]
Edleblute et al.

[11] Patent Number: 5,818,142
[45] Date of Patent: Oct. 6, 1998

[54] MOTOR PACK ARMATURE SUPPORT WITH BRUSH HOLDER ASSEMBLY

[75] Inventors: Calvin Michael Edleblute, Stewartstown, Pa.; Robert Anthony Meloni, Baltimore, Md.; Roger Quentin Smith, Reistertown, Md.; Hung The Du, Baltimore, Md.; Deborah Lynn Messmer, Belair, Md.

[73] Assignee: Black & Decker Inc., Newark, Del.

[21] Appl. No.: 508,013

[22] Filed: Jul. 27, 1995

[51] Int. Cl.$^6$ .................................................. H02K 13/00
[52] U.S. Cl. .................... 310/239; 310/242; 310/247; 310/71
[58] Field of Search ................ 310/50, 52, 89, 310/90, 42, 43, 242, 247, 239, 254, 71

[56] References Cited

U.S. PATENT DOCUMENTS

| | | | |
|---|---|---|---|
| 1,844,721 | 2/1932 | Sullivan | 310/247 |
| 2,240,150 | 4/1941 | Seyfried | 310/51 |
| 2,514,693 | 7/1950 | Chapman | 172/36 |
| 2,714,674 | 8/1955 | Seyfried | 310/91 |
| 2,810,084 | 10/1957 | Sprando | 310/60 |
| 2,842,692 | 7/1958 | Johnson et al. | 310/239 |
| 2,987,639 | 6/1961 | Bayless et al. | 310/247 |
| 3,047,832 | 7/1962 | Deakin | 310/247 |
| 3,182,218 | 5/1965 | Videtic | 310/239 |
| 3,292,412 | 12/1966 | Costabile | 72/335 |
| 3,398,306 | 8/1968 | Merrick et al. | 310/258 |
| 3,412,270 | 11/1968 | Wacek | 310/66 |
| 3,445,705 | 5/1969 | Fuller et al. | 310/247 |
| 3,484,860 | 12/1969 | Csaki | 310/42 |
| 3,617,786 | 11/1971 | Stielper | 310/242 |
| 3,654,504 | 4/1972 | Susdorf et al. | 310/239 |
| 3,656,018 | 4/1972 | Maher | 310/239 |
| 3,694,680 | 9/1972 | Jacyno | 310/50 |
| 3,699,366 | 10/1972 | Wood | 310/50 |
| 3,711,907 | 1/1973 | Parrent | 310/247 |
| 3,725,707 | 4/1973 | Leimbach et al. | 310/71 |
| 3,739,205 | 6/1973 | Winkelmann | 310/42 |
| 3,770,331 | 11/1973 | Sellers et al. | 308/72 |
| 3,784,856 | 1/1974 | Preston | 310/239 |
| 3,794,869 | 2/1974 | Apostoleris | 310/90 |
| 3,842,302 | 10/1974 | Apostoleris | 310/239 |
| 3,867,659 | 2/1975 | Seaburg | 310/239 |
| 3,875,436 | 4/1975 | MacFarland | 310/43 |
| 3,961,416 | 6/1976 | Otto | 29/596 |
| 3,978,354 | 8/1976 | Lee et al. | 310/60 R |
| 3,984,908 | 10/1976 | Ackley | 29/205 D |
| 4,027,521 | 6/1977 | McKee et al. | 72/404 |
| 4,038,573 | 7/1977 | Hillyer et al. | 310/71 |
| 4,048,530 | 9/1977 | Kaufman, Jr. | 310/89 |

(List continued on next page.)

FOREIGN PATENT DOCUMENTS

| | | |
|---|---|---|
| 0614251A2 | 8/1994 | European Pat. Off. . |
| 142747 | 3/1935 | Germany . |
| 2016789B2 | 8/1979 | Germany . |
| 3123517A1 | 2/1983 | Germany . |
| 54-104510 | 8/1979 | Japan . |
| 61-285040 | 12/1986 | Japan . |
| 6165443 | 6/1994 | Japan . |

*Primary Examiner*—Mark O. Budd
*Attorney, Agent, or Firm*—Harness, Dickey & Pierce, P.L.C.

[57] ABSTRACT

A series motor armature support assembly comprises a bearing receiving member (60), a pair of legs (62, 64) extending from the bearing receiving member (60), and a brush holding assembly receiving member (66, 68) coupled with each leg. The brush holding assembly receiving member (66, 68) includes a ledge (110, 110') coupled with a leg (62, 64), a stop (114, 114') coupled with the ledge (110, 110'), and a support (122, 122') extending from the bearing receiving member (60) towards the ledge (110, 110'). A securing member (70, 72) is coupled with the legs and secures the support to a stator (34), which is secured to a base (32). A brush holding assembly (80) is received in the brush holding member (66, 68). The brush holding assembly (80) includes a brush receiving member (160), a terminal connector (162) coupled with the brush receiving member (160), and a biasing retention member (164) coupled with the brush receiving member (160).

26 Claims, 3 Drawing Sheets

U.S. PATENT DOCUMENTS

| | | | |
|---|---|---|---|
| 4,049,984 | 9/1977 | Ishi et al. | 310/42 |
| 4,059,776 | 11/1977 | Schreiber et al. | 310/242 |
| 4,074,158 | 2/1978 | Cole | 310/90 |
| 4,074,162 | 2/1978 | Parzych | 310/245 |
| 4,142,120 | 2/1979 | Hallerback | 310/59 |
| 4,156,821 | 5/1979 | Kurome et al. | 310/166 |
| 4,166,227 | 8/1979 | Guglielmo | 310/242 |
| 4,166,968 | 9/1979 | Prittie | 310/239 |
| 4,219,749 | 8/1980 | Rettberg | 310/89 |
| 4,266,155 | 5/1981 | Neimela | 310/239 |
| 4,292,560 | 9/1981 | Vorndran | 310/242 |
| 4,293,789 | 10/1981 | King | 310/239 |
| 4,295,268 | 10/1981 | Punshon et al. | 29/596 |
| 4,322,647 | 3/1982 | Neroda et al. | 310/71 |
| 4,329,612 | 5/1982 | Averill | 310/247 |
| 4,340,830 | 7/1982 | Hoyer-Ellefsen | 310/89 |
| 4,340,831 | 7/1982 | Kuhlmann et al. | 310/239 |
| 4,342,929 | 8/1982 | Horne | 310/43 |
| 4,355,250 | 10/1982 | Langdon | 310/88 |
| 4,356,719 | 11/1982 | Sutherland et al. | 72/391 |
| 4,366,403 | 12/1982 | Simpson et al. | 310/239 |
| 4,384,224 | 5/1983 | Spitler et al. | 310/81 |
| 4,414,481 | 11/1983 | de Jong | 310/42 |
| 4,491,752 | 1/1985 | O'Hara et al. | 310/71 |
| 4,498,230 | 2/1985 | Harris et al. | 29/597 |
| 4,504,754 | 3/1985 | Stone | 310/90 |
| 4,513,214 | 4/1985 | Dieringer | 310/71 |
| 4,523,116 | 6/1985 | Dibbern, Jr. et al. | 310/71 |
| 4,572,606 | 2/1986 | Neumann et al. | 333/262 R |
| 4,590,398 | 5/1986 | Nagamatsu | 310/239 |
| 4,593,220 | 6/1986 | Cousins et al. | 310/239 |
| 4,593,221 | 6/1986 | Harris et al. | 310/242 |
| 4,613,781 | 9/1986 | Sanders | 310/239 |
| 4,631,433 | 12/1986 | Stokes | 310/89 |
| 4,673,837 | 6/1987 | Gingerich et al. | 310/239 |
| 4,677,329 | 6/1987 | Secoura | 310/47 |
| 4,746,828 | 5/1988 | Nado et al. | 310/90 |
| 4,748,353 | 5/1988 | Klingenstein et al. | 310/50 |
| 4,763,031 | 8/1988 | Wang | 310/83 |
| 4,774,430 | 9/1988 | Rodriguez et al. | 310/239 |
| 4,800,312 | 1/1989 | Wacek et al. | 310/239 |
| 4,851,730 | 7/1989 | Fushiya et al. | 310/249 |
| 4,885,496 | 12/1989 | Wheeler | 310/254 |
| 4,896,067 | 1/1990 | Walther | 310/239 |
| 4,926,075 | 5/1990 | Fushiya et al. | 310/50 |
| 4,941,842 | 7/1990 | Nakashima et al. | 439/399 |
| 4,963,779 | 10/1990 | Lentino et al. | 310/71 |
| 4,972,113 | 11/1990 | Newberg | 310/217 |
| 4,973,261 | 11/1990 | Hatagishi et al. | 439/397 |
| 5,036,583 | 8/1991 | Prochaska et al. | 29/882 |
| 5,041,006 | 8/1991 | Van Zanten et al. | 439/397 |
| 5,053,665 | 10/1991 | Yamaguchi et al. | 310/239 |
| 5,055,728 | 10/1991 | Looper et al. | 310/91 |
| 5,099,164 | 3/1992 | Wheeler | 310/254 |
| 5,153,982 | 10/1992 | Bertocchi | 29/732 |
| 5,182,848 | 2/1993 | Wheeler | 29/596 |
| 5,196,750 | 3/1993 | Stobl | 310/239 |
| 5,227,685 | 7/1993 | Krouse | 310/71 |
| 5,280,212 | 1/1994 | Oba | 310/248 |
| 5,315,199 | 5/1994 | McCracken et al. | 310/239 |
| 5,373,210 | 12/1994 | Baer et al. | 310/247 |
| 5,382,855 | 1/1995 | Cousin | 310/71 |
| 5,397,952 | 3/1995 | Decker et al. | 310/242 |

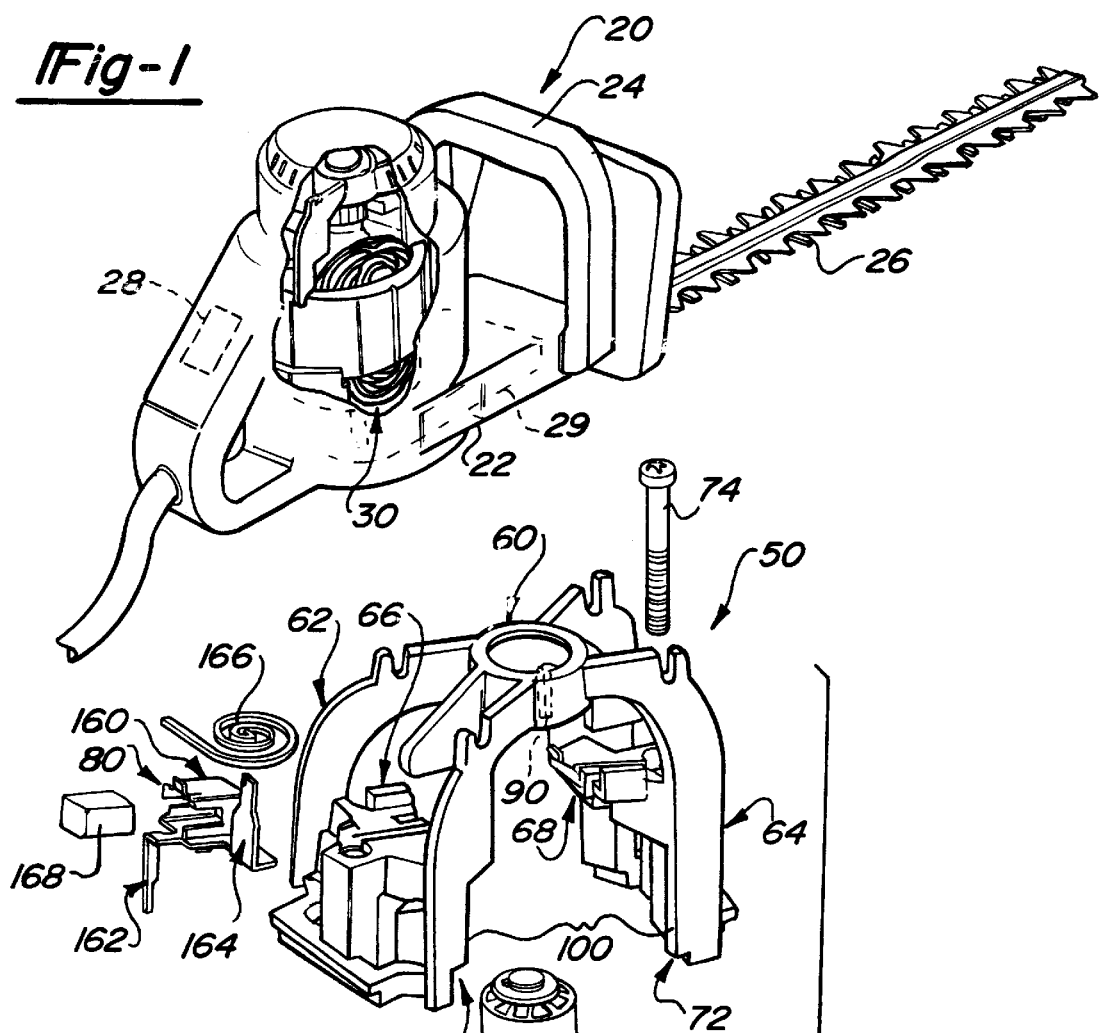
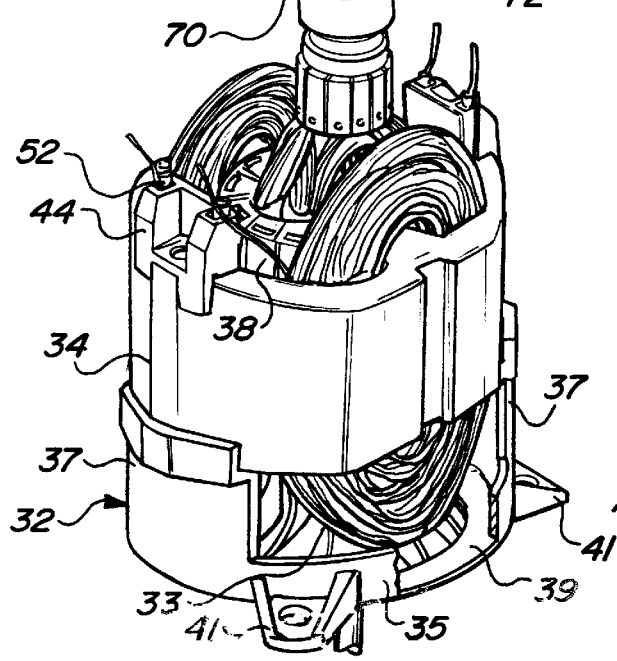

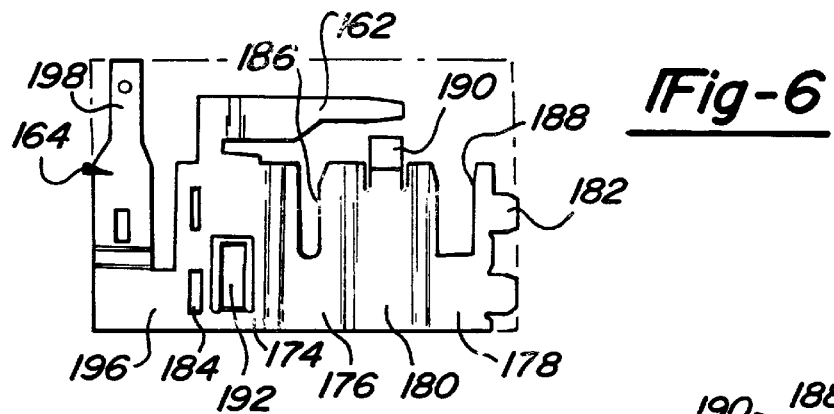
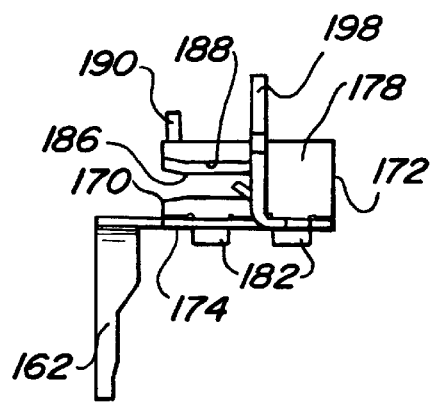
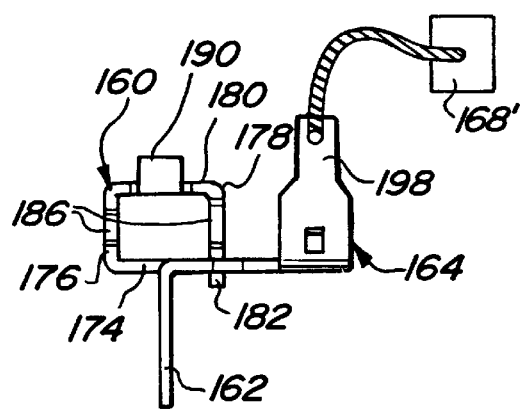
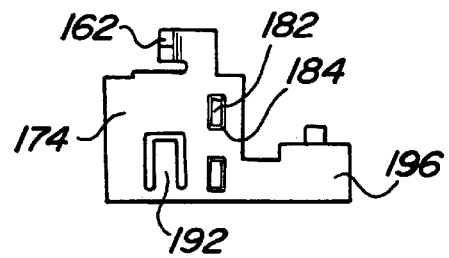
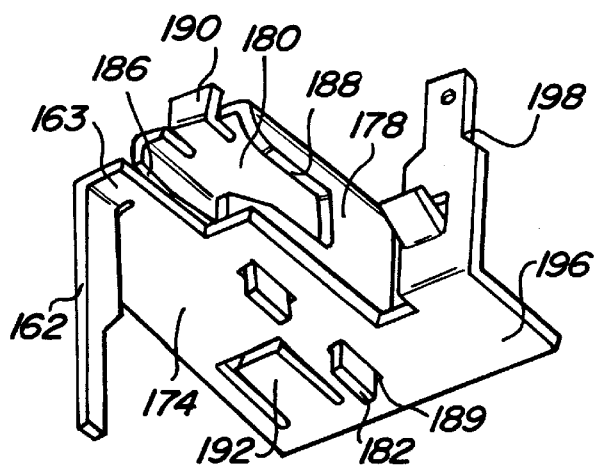

MOTOR PACK ARMATURE SUPPORT WITH BRUSH HOLDER ASSEMBLY

FIELD OF THE INVENTION

The invention relates to series motors such as those used for hedge trimmers, string trimmers, and other power tools. More particularly, the present invention relates to an improved armature support and brush holder assembly.

BACKGROUND OF THE INVENTION

In the consumer market, several powered devices utilize series motors. However, due to the particular housing structure of the powered device, a varying designs of series motors have been utilized. However, because of the desire to provide consumer devices with common series motors which may be interchanged and used in all types of powered devices, there is a desire to provide a series motor which will fit the various powered device housings. Also, it is desirable to provide a motor which reduces cost and enhances motor assembly, as well as optimizing the design for automation assembly. Of course, these design goals are not unique to consumer devices, but are equally desirable for professional powered devices which utilize series motors.

SUMMARY OF THE INVENTION

Accordingly, it is an object of the present invention to provide an improved series motor with an armature support and brush holder assembly embodying the foregoing design objectives.

In accordance with one aspect of the invention, a motor armature support comprises a bearing receiving member, a pair of support legs extending from the bearing receiving member, and a brush holding receiving member coupled with each leg. The brush holding receiving member includes a ledge coupled with the leg, a stop coupled with the ledge, and a support member extending from the bearing receiving member towards the ledge. Also included is a securing member to secure the motor armature support with a stator. A securing member is likewise coupled with each of the legs. Preferably, the motor armature support is a molded unitary plastic construction. Each of the legs includes a pair of leg members having a ledge spanning between both pair of leg members. The ledge includes an aperture to receive a securement member from the brush holding assembly as well as a slot to receive a guiding tab from the brush holding assembly. Further, U-shaped apertures are defined between the pair of legs. The U-shaped apertures provide outstanding air passage through the motor armature support to cool the motor as well as the brush holding assembly.

In accordance with the second aspect of the invention, a brush holding assembly comprises a brush receiving member, a terminal connector coupled with the brush receiving member, and a biasing retention member coupled with the brush receiving member. The brush holding assembly is a stamped unitary metallic member formed into an overall box shape. A spiral spring is coupled with the biasing retention member to bias a brush which is received in the box shaped receiving member. Preferably the box shaped receiving member has two open ends, a base wall, opposing side walls, and a top wall. The terminal connector extends downward from the base wall at one of the open ends and the biasing retention member extends from the base wall adjacent one of the side walls. The biasing retention member includes a post extending upward from the base wall in a direction opposite the terminal connector.

In accordance with the third aspect of the invention, a motor armature support assembly comprises a bearing receiving member, a pair of legs extending from the bearing receiving member, a brush holding receiving member coupled with each leg, the brush holding receiving member including a ledge coupled with a leg, a stop coupled with the ledge, and a support member extending from the bearing receiving member. Also, a securing member is coupled with the legs to secure the legs with a stator. A brush holding assembly is received on the ledge and includes a brush receiving member, a terminal connector coupled with the brush receiving member and a biasing retention member coupled with the brush receiving member.

In accordance with the fourth aspect of the invention, a series motor comprises a stator core, field windings coupled with the stator core, terminal blocks on the stator core coupled with the field windings, an armature and shaft, a base support, and an armature motor support assembly. The armature motor support assembly is comprised of a bearing receiving member, a pair of legs extending from the bearing receiving member, a brush holding receiving member coupled with each leg, the brush holding receiving member including a ledge coupled with a leg, a stop coupled with the ledge, and a support member extending from the bearing receiving member. Also, a securing member is coupled with the legs to secure the legs with a stator. A brush holding assembly is received on the ledge and includes a brush receiving member, a terminal connector coupled with the brush receiving member and a biasing retention member coupled with the brush receiving member.

Additional objects and advantages of the invention will become apparent from the detailed description of the accompanying drawings or may be learned by practice of the invention.

BRIEF DESCRIPTION OF THE DRAWINGS

The accompanying drawings, which are incorporated in and constitute a part of the specification, illustrate the present invention and together with the description serve to explain the principals of the invention. In the drawings, the same reference numerals indicate the same parts.

FIG. 1 is a perspective view, partially in section, of a power tool in accordance with the present invention.

FIG. 2 is an exploded perspective view of a motor assembly in accordance with the present invention.

FIG. 6 is a plan view of a blank of a brush holding assembly in accordance with the present invention.

FIG. 7 is a perspective view of the brush holding assembly in accordance with the present invention.

FIG. 8 is a front elevation view of the brush holding assembly of FIG. 7.

FIG. 9 is a side elevation view of the brush holding assembly of FIG. 7.

FIG. 10 is a bottom elevation view of the brush holding assembly of FIG. 7.

DETAILED DESCRIPTION OF THE PREFERRED EMBODIMENT

Figure 3:
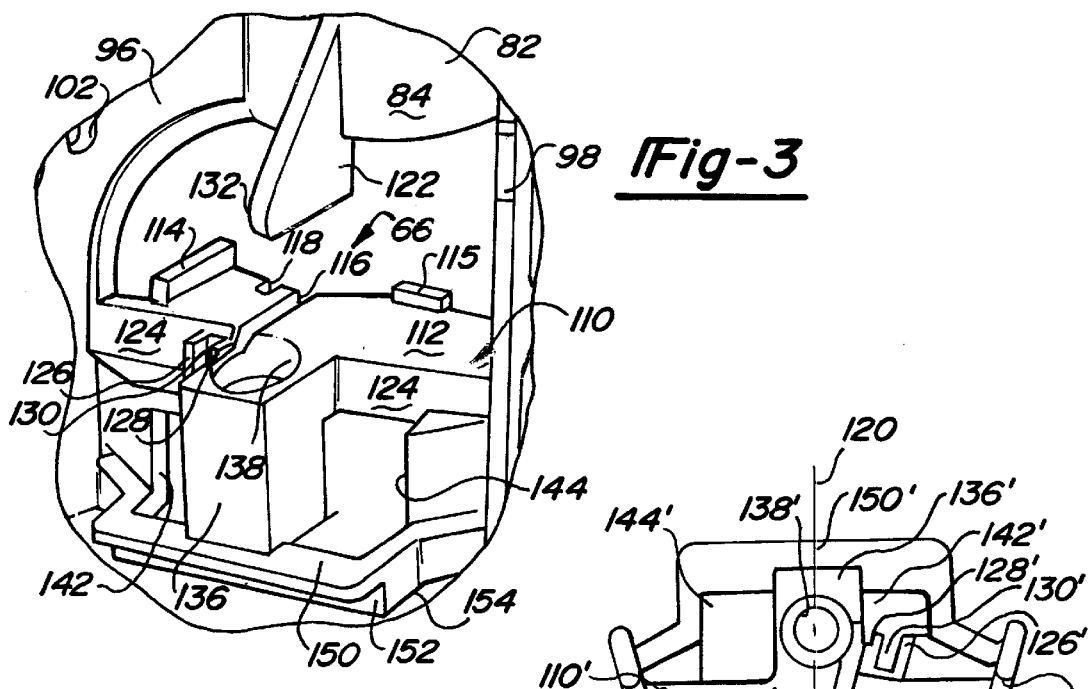
FIG. 3 is an enlarged perspective view of FIG. 2 of the brush holding receiving mechanism.

The preferred embodiment of the present invention is a powered device, such as hedge trimmers, string trimmers, or power tool devices which include a series motor. An example of a device is a hedge trimmer 20 as illustrated in FIG. 1. The preferred embodiment more particularly is an improved motor pack 30 in the hedge trimmer 20.

As shown in FIG. 1, in accordance with the present invention, a power tool, herein a hedge trimmer, comprises a housing 22 with a handle 24 and reciprocating blades 26. The hedge trimmer includes a trigger 28 which energizes the motor 30. The motor 30 is positioned within the housing 22 as illustrated in FIG. 1.

Turning to FIG. 2, the motor 30 is illustrated with a base 32, fan 33, stator 34, field windings 36, armature 38 including an armature shaft 40 which includes bearing 42 and commutator 46. Also, terminal blocks 44 are positioned onto the stator 34. The shaft 40 has the commutator 46 at one end and a splined end (not shown) to couple with a drivetrain of the reciprocating blades 26. Further, an armature shaft support 50 is positioned on the stator 34.

The base 32, as seen in FIG. 2, has an annular portion 35 with extending members 37 which support the stator 34. Also, the annular portion 35 includes a radially inwardly extending flange 39. The flange 39 extends between the armature 38 and the fan 33. The flange 39 acts as a baffle to maximize the amount of air passing through the motor, as well as increasing efficiency of the fan and minimizing air circulation around the fan. Also, the base 32 includes members 41 to secure the motor 30 to the drivetrain 29.

Electrical wires (not shown) are inserted into one of the receptacles 52 of the terminal blocks 44 on each opposing side of the stator 34 to connect the electrical power source to the motor 30. The wires electrically convey the current from the electric source to the field windings 36 and commutator 46 which rotate the armature 38 which, in turn, rotates the armature shaft 40 which via the drivetrain 29 reciprocates the blades 26.

The armature support 50 is illustrated in FIGS. 2 through 5 and includes a bearing receiving member 60, a pair of legs 62 and 64, a brush holding assembly receiving member 66 and 68, and stator securement members 70 and 72 and a threaded fastener 74 to secure the support 50 with the stator 34 and base 32. Also, brush holding assemblies 80 are received in the armature support 50.

The bearing receiving member 60 includes an annular member 82 having an outer circular surface 84 and an inner circular surface 86 as well as a circular end face 88. The bearing 42 is positioned within the annular member 82 and is adjacent the inner circular surface 86. A finger 90 extends from the annular member 82 which, in turn, extends into a pocket 92 on the bearing 42 to position the bearing 42, against rotation, within the bearing annular member pocket 94.

The legs 62 and 64 are substantially identical and are rotated 180° from one another. The below disclosure with respect to one will relate to the other. The legs 62, 64 include a pair of leg members 96, 96' and 98, 98' which extend from the exterior surface 84 of the annular member 82. The leg members 96, 96' and 98, 98' have an overall arcuate shape and when viewed in side elevation the two adjacent leg members 98, 96' and 96, 98' define U-shaped openings 100. The U-shaped opening 100 provide an air passage which enables cooling air to cool the commutator 46, armature 38 as well as the brush holding assemblies 80. Also, the leg members 96, 96' and 98, 98' include slots 102, 102' and 104, 104' which receive wires (not shown) which connect with the terminal block receptacles 52. The slots 102, 102', 104, 104' provide strain relief to prevent the wires from vibrating off of the receptacles 52.

The brush holding assembly receiving members 66, 68 spans between the legs members 96, 98 and 96', 98' as best illustrated in FIG. 3. The brush holding assembly receiving members 66, 68 include a ledge 110, 110' spanning between the leg members 96, 98 and 96', 98'. The ledge 110, 110' includes a first planar surface 112, 112' which is substantially horizontal. The planar surface 112, 112' includes a pair of stops 114, 115 and 114', 115', a guiding groove 116, 116' and a slot 118, 118'. The stop 114, 114' is positioned at a side edge of the ledge 110, 110' and stop 115, 115' is positioned at the rear edge of the ledge 110, 110', to provide stopping blocks for the brush holding assembly 80. The stop 114, 114' is at an angle with respect to an axis 120. Thus as the brush holding assembly 80 rests against the stop 114, 114' the brush holding assembly 80 is offset with respect to the axis 120. The guiding slot 116, 116' which acts as a guiding groove to position the brush holding assembly 80 and the ledge 110, 110' is likewise angled and offset with respect to the axis 120. The aperture 118, 118', which receives a securement member of the brush holding assembly 80, is angled with respect to the axis 120.

A support 122, 122' extends from the outer surface 84 of the annular member 82 to support the brush holding assemblies 80 within the brush holding assembly receiving members 66, 68. The support member 122, 122' extends downward a desired distance to contact the top of the brush holding assemblies 80 to maintain the brush holding assemblies 80 on the ledge 110, 110'.

The ledge 110, 110' includes a front surface 124, 124' which is substantially vertical and intersects the horizontal surface 112, 112'. A pair of wall members 126, 126' and 128, 128' extend from the vertical surface 124, 124' to define a slot 130, 130' which positions a terminal connector on the brush holding assembly with respect to the terminal block connector 52.

Also an aperture 132, 132' is formed between the leg members 96, 98, 96', 98', ledge 110, 110', and bearing annular member 82. The aperture 132, 132' enables cooling air to pass through the housing to the commutator, armature and brush holding assemblies 80.

A boss 136, 136' extends from the face 124 and has a surface continuous with the horizontal surface 112, 112'. The boss 136, 136' includes an aperture 138, 138' which enables the threaded fasteners 74 to pass through the aperture 138, 138' into the stator 34 and secures into the base 32 to secure the armature motor support 50 with the remainder of the motor.

A pair of apertures 142, 142' and 144, 144' are formed on each side of the boss 136. The apertures 142, 142' and 144, 144' receive the terminal box connector portions 52.

A second ledge member 150, 150' connects the free ends of the legs 96, 96' and 98, 98' as well as the boss 136, 136' to rigidly secure the legs members 96, 98 and 96', 98' at their free ends. Ledge member 150, 150' adds rigidity to the legs as well as to the support 50. The ledge member 150, 150' includes a flange 152, 152' having a bottom surface 154, 154' which rests upon the stator 34.

Figure 4:
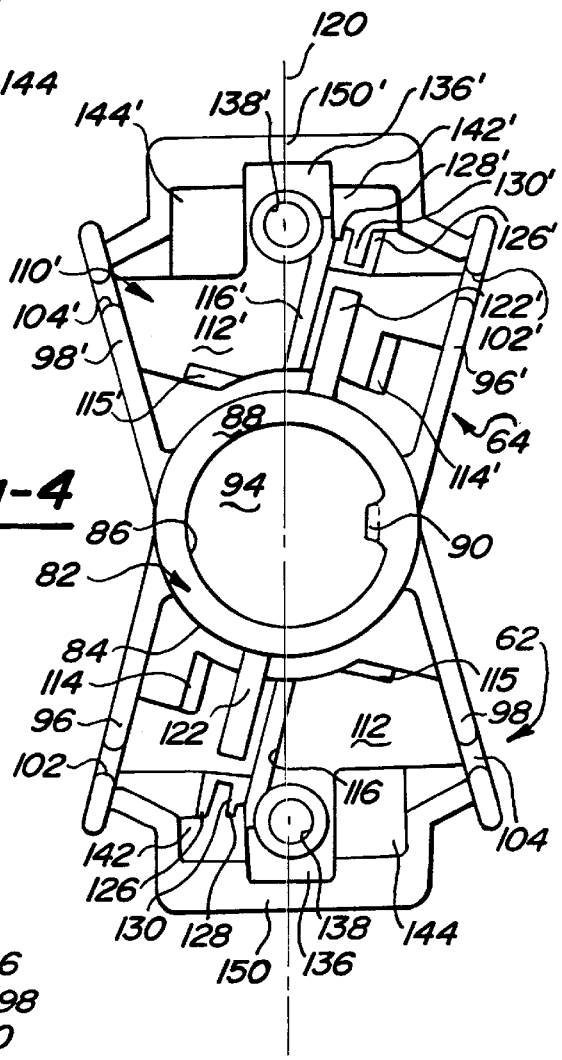
FIG. 4 is a top plan view of the motor armature support of FIG. 2.
Figure 5:
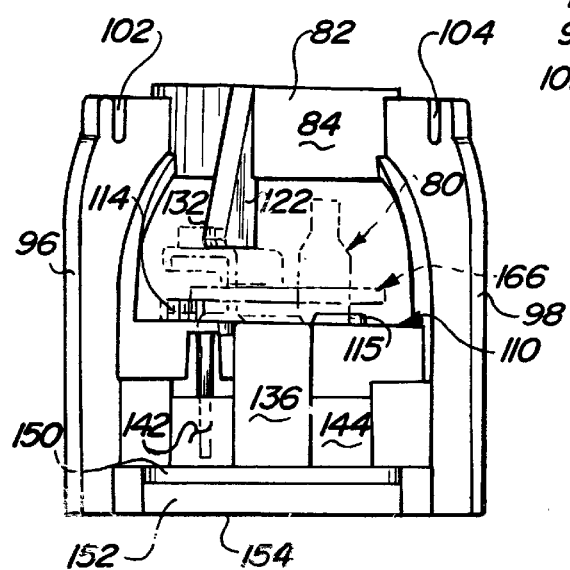
FIG. 5 is a side plan view of the motor armature support of FIG. 2.

As can be seen in FIG. 4, the brush holding assembly receiving members 66, 68 are offset with respect to one another and are on an angle with respect to the axis 120 such that the brush holding assembly receiving members 66, 68 oppose one another and are substantially collinear on a line through the receiving members 66, 68. The armature support 50 is molded as a one-piece unitary member from a desired plastic material. The apertures 100, 132, 132' are large enough so that heat generated from the motor is dissipated so that melting of the plastic does not occur. Also, the apertures enable the brush holding assemblies 80 to be exposed to air drawn through the motor.

FIGS. 6 through 10 illustrate the brush holding assembly 80. The brush holding assembly 80 includes a brush receiving member 160, a terminal connector 162, and a biasing retention member 164. The biasing retention member 164 retains a spring 166 onto the brush holding assembly 80. Also, a shuntless brush 168 is illustrated which is received in the brush receiving member 160 and is biased by the spring 166. Here when the shuntless brush 168 is used, the spring 166 also acts as a terminal conducting current.

The brush receiving member 160 has an overall box shape and includes open ends 170 and 172. The box-shaped receiving member 160 includes a base 174, a pair of side walls 176 and 178, and a top wall 180.

The brush holding assembly 80 is stamped from a rectangular metallic sheet. The stamping as illustrated in FIG. 6 is then bent and folded to form the box shaped assembly as seen in FIGS. 7 through 10. As can be seen in FIG. 6, the assembly is stamped from a rectangular piece of material. The stamping maximizes the amount of material which is used to form the brush holding assembly. This maximization of material is important since the brush holding assemblies 80 act as heat sinks to dissipate heat from the motor while reducing electrical resistance which, in turn, reduces heat generated by the electrical current. The more mass which is present the more effective the heat sink. Further, since the brush holding assemblies 80 carry electrical current and in turn generate heat, this heat must be dissipated to prevent melting of the support 50. By exposing three sides and both ends of the brush holding assemblies 80 in the apertures 132, 132' (see FIGS. 3 and 5), heat is dissipated as air is passed through the motor. Thus, the heat in the brush holding assemblies 80 is dissipated by the design of the assemblies as well as by the design of the armature support 50.

As the assembly 80 is bent and folded, the tabs 182 in the side wall 178 are inserted through apertures 184 in the base 174 to hold the box in it's folded position. Also, the tabs 182 are used to guide the brush holding assemblies 80 into the brush holding assembly receiving members 66, 68 where the tabs 182 engage the groove 116, 116' as they slide on the ledge 110, 110'. The side walls include apertures 186 and 188. Aperture 188 has a desired width to receive the end of the spring 166 to bias the brush 168 against the commutator 46. The aperture 186 enables passage of a pig tail when a shunted brush 168' is used. The top wall 180 includes a stop 190 which abuts the support member 122, 122' to prohibit further insertion of the brush holding assembly 80 into the gap between the legs 62 and 64.

The base 170 includes a cantilevered finger 192 which extends away from the base 170 to secure the brush holding assemblies 80 on the ledge 110, 110' by engaging the slot 118, 118'. As the brush holding assemblies 80 are slid along the ledge surface 112, the finger 192 is compressed and once it reaches the slot 118, 118', it springs out to secure the brush holding assemblies 80 on the ledge 110.

Also the base includes a unitarily formed terminal 162. The terminal 162 is transverse to the base 174 and extends downwardly from the base 174. A shoulder portion 163 extends directly from the base 174 and has an overall L-shape before it is bent downward to form the terminal 162. Also, the base 174 includes an extending portion 196 having a post 198 bent upwards from the portion 196 to form the spring retention member. The post 198 extends from the base in an opposite direction of the terminal 162. The post 198 serves a dual function when a shunted brush 168' is used as seen in FIG. 8. Here the post 198 acts as a terminal as well as the spring retention member.

As the brush holding assemblies 80 are slid onto the ledges 110, 110', the terminal 162 is positioned in slot 130, 130' to position and align the terminal 162 to be inserted into the terminal block receptacle 52. When the brush holding assemblies 80 are slid onto the ledges 110, 110', the base 174 is in contact with the ledge while the remaining side walls 176, 178, top wall 180, and post 198 are exposed to enable heat dissipation.

The present brush holding device 80 enables the spring 166 to be added to the brush holding assembly 80 prior to insertion of the brush holding assemblies 80 onto the armature support 50. The shuntless brush 168 can be axially slid into the box 160 and the brush holding assemblies 80 can be slid radially onto the ledges 110, 110'. This enables the brush holding assembly 80 to be assembled by an automated process directly onto the armature support 50.

Also, the armature support 50 with the brush holding assemblies 80 in place, may be axially positioned onto the stator 34. This likewise can be done by an automated process since straight line motion is used. Also, with the terminal 162 aligned in the slot 130, 130', the terminal 162 is easily positioned into the terminal receptacle 52 of the terminal block 44 which eliminates the previously blind hole process which was used in the past. The armature support 50 can be easily positioned onto the rest of the motor to speed up the motor assembly process as well as reducing the cost of assembling the motor. Further, the electrical wires for connecting with the power source can be plugged into the other electrical receptacles 52.

It will be apparent to those skilled in the art that various modifications and variations may be made in the series motor of the present invention without departing from the scope or spirit of the present invention. Thus, it is intended that the present invention cover these modifications and variations provided they come within the scope of the appended claims and their equivalents.

What is claimed is:

1. A motor armature support assembly comprising:

a bearing receiving member;

a pair of legs extending from said bearing receiving member;

a brush holding assembly receiving member coupled with each leg, said brush holding assembly receiving member including a ledge coupled with said leg, a stop coupled with said ledge and a support member extending from said bearing receiving member toward said ledge and an opening defined between said leg, ledge and support member enabling passage of air to cool a motor;

a pair of brush holding assemblies, each assembly including a brush receiving member, a terminal connector coupled with said brush receiving member and a biasing retention member coupled with said brush receiving member, said brush holding assemblies positioned in said brush holding assembly receiving members such that each brush holding assembly abutting said stop to prohibit movement of said brush holding assembly and said support member contacting said brush holding assembly for maintaining said brush holding assembly on said ledge and said brush holding assemblies being in said opening between said ledge and support member such that said brush holding assemblies dissipate heat as cooling air passes through said openings; and means for securing said motor armature support with a stator, said securing means coupled with said pair of legs.

2. The motor armature support assembly according to claim 1, wherein said ledge includes an aperture for receiving a securement member from a brush holding assembly.

3. The motor armature support assembly according to claim 1, wherein said ledge includes a slot for receiving a tab member from a brush holding assembly.

4. The motor armature support assembly according to claim 1, wherein said ledge includes a pair of wall members transverse to said ledge for receiving and positioning a terminal from a brush holding assembly.

5. The motor armature support assembly according to claim 1, wherein each leg includes a pair of leg members having said ledge spanning between a pair of leg members.

6. The motor armature support assembly according to claim 1, wherein said brush holding assembly receiving members oppose one another.

7. The motor armature support assembly according to claim 1, wherein said bearing receiving member includes an annular member with said leg extending from an exterior surface of said annular member.

8. The motor armature support assembly according to claim 1, wherein a finger is coupled with said annular member for positioning a bearing on an armature shaft in said bearing receiving member.

9. The motor armature support assembly according to claim 1, wherein said motor armature support is a molded unitary plastic construction.

10. The motor armature support assembly according to claim 1, wherein said pair of legs define U-shaped apertures for enabling air passage.

11. The motor armature support assembly according to claim 1, wherein apertures are formed between said bearing receiving member and said ledge for enabling air passage.

12. The motor armature support assembly according to claim 1, wherein each said leg includes at least one terminal receiving aperture at a free end of said leg.

13. The motor armature support assembly according to claim 1, wherein a spiral biasing member is coupled with said biasing retention member.

14. The motor armature support assembly according to claim 1, wherein said terminal and biasing retention member extend from said brush receiving member in opposing directions.

15. The motor armature support assembly according to claim 1, wherein said brush receiving member includes a member for securing said brush holding assembly to a motor armature support.

16. The motor armature support assembly according to claim 15, wherein said member is a cantilevered finger.

17. The motor armature support assembly according to claim 1, wherein said brush receiving member includes a slot for receiving an end of a biasing member.

18. The motor armature support assembly according to claim 1, wherein a brush is received in said brush receiving member.

19. The motor armature support assembly according to claim 1, wherein said brush receiving member includes a stop for limiting insertion onto a motor armature support.

20. The motor armature support assembly according to claim 1, wherein said brush receiving member includes a tab for guiding said brush holding assembly onto a motor armature support.

21. The motor armature support assembly according to claim 1, wherein said brush receiving member has an overall box shape with two open ends and a base wall, opposing side walls and a top wall.

22. The motor armature support assembly according to claim 21, wherein said terminal connector extends downward from said base wall at one of said open ends.

23. The motor armature support assembly according to claim 1, wherein said securing means includes a member on each leg for receiving a fastener.

24. The motor armature support assembly according to claim 1, wherein said brush holding assemblies are exposed in said brush holding assembly member to maximize air flow over said brush holding assemblies.

25. The motor armature support assembly according to claim 1, wherein said brush holding assemblies are heat sinks to dissipate heat from the motor.

26. A motor assembly comprising:

a base;

a stator coupled with said base;

field coils coupled with said stator;

terminal means for conducting current coupled with said field coils;

armature including a shaft with a commutator and bearing, said armature positioned within said field coils;

an armature support assembly including a bearing receiving member, a pair of legs extending from said bearing receiving member, a brush holding assembly receiving member coupled with each leg, said brush holding assembly receiving member including a ledge coupled with said leg, a stop coupled with said ledge and a support member extending from said bearing receiving member toward said ledge and an opening defined between said leg, ledge and support member enabling passage of air to cool the motor;

a pair of brush holding assemblies, each assembly including a brush receiving member, a terminal connector coupled with said brush receiving member, and a biasing retention member coupled with said brush receiving member, said brush holding assemblies positioned in said brush holding assembly receiving members such that each brush holding assembly abutting said stop to prohibit movement of said brush holding assembly and said support member contacting said brush holding assembly for maintaining said brush holding assembly on said ledge and said brush holding assemblies being in said opening between said ledge and support member such that said brush holding assemblies dissipate heat as cooling air passes through said openings;

means for securing said motor armature support with said stator, said securing means coupled with said pair of legs.

* * * * *